(No Model.)
S. DICKERSON.
STUBBLE SHAVER AND CULTIVATOR.
No. 474,336. Patented May 3, 1892.
Fig. 1.
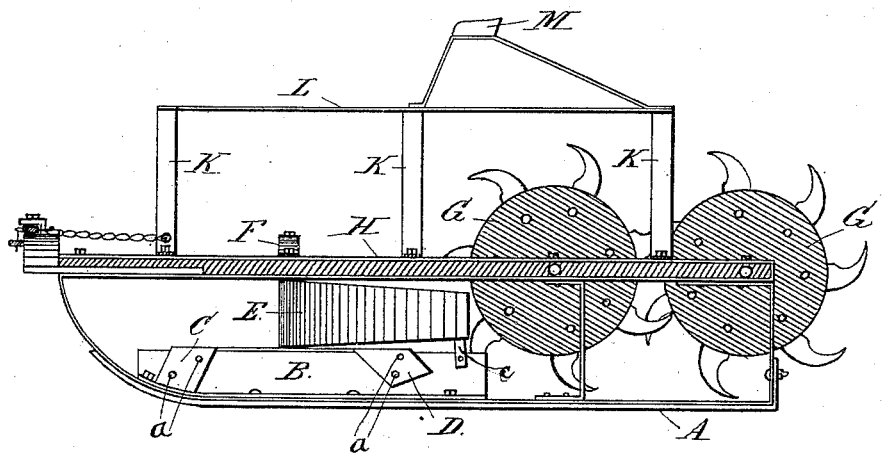
Fig. 2.
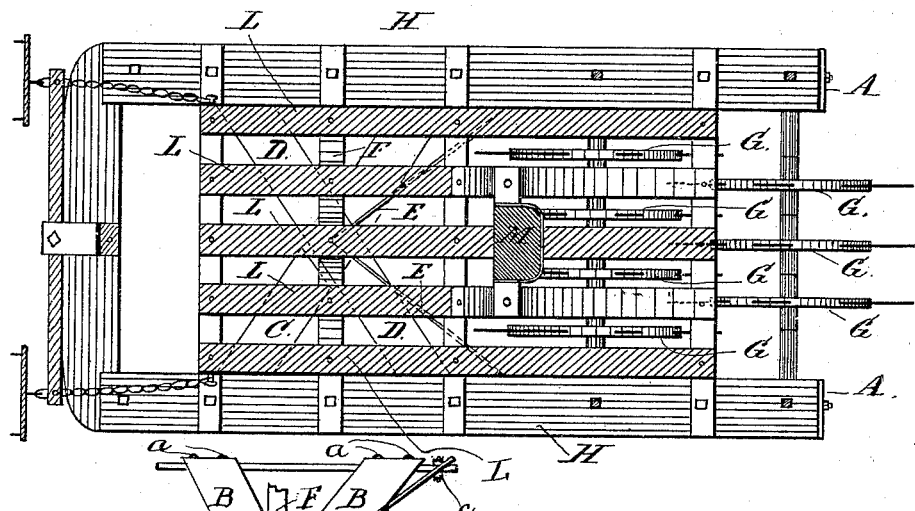
Fig. 3.
WITNESSES
Helmuth Holtz
Percy D. Parks
INVENTOR
Simeon Dickerson
by W. R. Stringfellow
Attorney

United States Patent Office.

SIMEON DICKERSON, OF FRANKLIN, LOUISIANA.

STUBBLE SHAVER AND CULTIVATOR.

SPECIFICATION forming part of Letters Patent No. 474,336, dated May 3, 1892.

Application filed September 18, 1891. Serial No. 406,123. (No model.)

*To all whom it may concern:*

Be it known that I, SIMEON DICKERSON, a citizen of the United States, residing at Franklin, in the parish of St. Mary and State of Louisiana, have invented certain new and useful Improvements in a Combined Stubble Shaver and Cultivator; and I do declare the following to be a full, clear, and exact description of the invention, such as will enable others skilled in the art to which it appertains to make and use the same.

My invention relates to an improvement in a combined stubble shaver and cultivator; and its novelty will be fully understood from the following description and claim when taken in connection with the annexed drawings; and the object of my invention is to provide an agricultural implement for cultivating sugar-cane that will scrape and cultivate the stubble at one operation. I attain this object by the mechanism illustrated in the accompanying drawings, in which—

Figure 1 is a side view. Fig. 2 is a top view. Fig. 3 is a detached top view of the cutting-blades, the flukes, part of the arch, and means for connecting the said parts.

Similar letters refer to similar parts throughout the several views.

In the drawings, A refers to runners, which are covered with metal similar to a sleigh.

B are metal supporters rigidly attached to A, and to which blades C and D are attached for the purpose of supporting them above the said runners. The blades C and D overlap the supporters B upon their outer sides and are secured thereto by suitable bolts *a*. These blades extend diagonally across the front of the machine and cross each other at the forward point of the flukes E.

E is a fluke, which is held in position by means of a bolt passing through metal arch F and is supported in the rear by braces *c* on rear portion of B. Suitably journaled on rigid shafts I place teeth or cutters G, said shafts being attached to frame H, also uprights or braces K, and which support slats L, and placed above same is a seat, as shown by M.

In practice a team is attached to my implement and the runners A are placed in the furrows, while the blades C and D straddle the row of stubble-cane, and as the implement is moved forward the blades C and D shave or scrape the top of stubble-cane, while the fluke E throws to each side the trash thus cut and the stubble teeth or cutters G excavate or cut up the stubble, the latter being rotated by the movement of the implement as it moves forward.

A striking advantage of my invention is the combining of a shaver and cutter in one implement, economy in construction, and saving of labor.

Having described my invention, what I claim, and desire to secure by Letters Patent, is—

In a stubble shaver and cultivator of the character described, the combination of the blades C and D and the flukes E with the rotary cutters G, substantially as and for the purpose set forth.

In testimony whereof I affix my signature in presence of two witnesses.

SIMEON $\overset{\text{his}}{\times}$ DICKERSON.
mark

Witnesses:
 JOSEPH JACOBS,
 HELMUTH HOLTZ.